P. J. FLYNN.
FEED BAG SUPPORT.
APPLICATION FILED MAR. 14, 1912.
1,053,721. Patented Feb. 18, 1913.
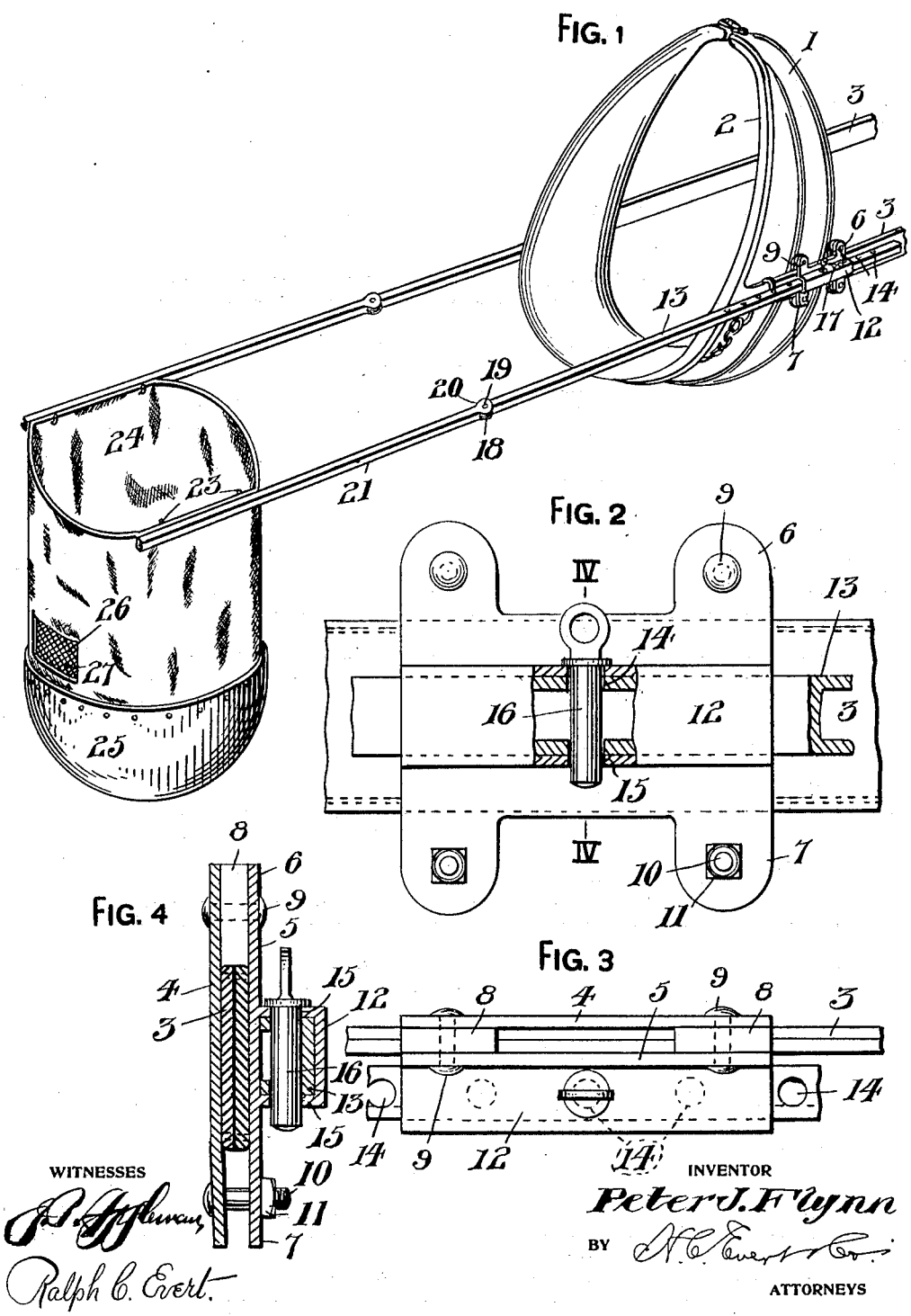

UNITED STATES PATENT OFFICE.

PETER J. FLYNN, OF PITTSBURGH, PENNSYLVANIA.

FEED-BAG SUPPORT.

1,053,721. Specification of Letters Patent. Patented Feb. 18, 1913.

Application filed March 14, 1912. Serial No. 683,901.

*To all whom it may concern:*

Be it known that I, PETER J. FLYNN, a citizen of the United States of America, residing at Pittsburgh, in the county of Allegheny and State of Pennsylvania, have invented certain new and useful Improvements in Feed-Bag Supports, of which the following is a specification, reference being had therein to the accompanying drawing.

This invention relates to feed bag supports, and the primary object of my invention is the provision of simple and effective means, as will be hereinafter set forth, for supporting a feed receptacle from the collar or tugs of the harness, whereby a horse can freely move the head when feeding, thereby insuring perfect comfort, proper ventilation and preventing waste of food.

Another object of this invention is to provide a foldable feed bag support that can be easily and quickly placed in position and adjusted whereby a horse can readily obtain feed from the bag.

A further object of this invention is to provide a foldable feed bag support that is durable, inexpensive to manufacture and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a perspective view of the feed bag support, Fig. 2 is an enlarged side elevation of a tug or trace attachment, partly broken away and partly in section, Fig. 3 is a plan of the same, and Fig. 4 is a cross sectional view taken on the line IV—IV of Fig. 2.

The reference numeral 1 denotes a horse collar having hames 2 to which are attached the forward ends of tugs or traces 3.

Attached to the inner and outer sides of the tugs 3 are side plates 4 and 5 having the upper edges thereof, at the ends, provided with apertured ears 6 and 7. Arranged between the apertured ears 6 are spacing washers 8 that are retained between said ears by rivets 9 or other fastening means. The apertured ears 7 are connected by bolts 10 and nuts 11 and it is through the medium of the bolts and nuts that the side plates 4 and 5 can be clamped upon the tug 3.

The side plates 5 are provided with longitudinal rectangular guides 12 for channel supports 13, said supports having the upper and lower sides thereof provided with openings 14 adapted to aline with openings 15 in the guides 12. Pins 16 are arranged within the openings 14 and 15 to hold the supports 13 in said guides. The pins 16 can be attached by chains 17 to the apertured lugs 6, whereby the pins 16 cannot become accidentally displaced or lost.

The forward ends of the channel supports 13 are provided with hinge members 18 and pivotally connected to said members by pins 19 are hinge members 20 of forwardly extending arms 21, said arms representing a foldable prolongation of said supports. The arms 21 have the forward ends thereof provided with confronting hooks 23 and detachably mounted upon said hooks are the upper edges of a flexible bag 24 having a metallic bottom or pan 25. The front of the flexible bag 24 has a ventilating opening 26 covered by a screen 27. The flexible bag is preferably made of canvas and the metallic bottom or pan 25 of a non-corrosive material, as galvanized sheet metal.

When the feed bag support is not in use, the bag 24 is removed, the supports 13 withdrawn from the guides 12 and the arms 21 folded upon said supports. The entire device can then be readily carried under the driver's seat of a vehicle.

What I claim is:—

A feed bag support comprising two pairs of side plates, each including an inner and an outer plate and each plate of each pair of plates provided with two pairs of lugs, the plates of each pair adapted to be positioned against the inner and outer faces of a tug, means extending through the lugs of each pair of plates for detachably clamping the plates to the tug, the outer plate of each pair of plates having its outer face formed centrally with a longitudinally extending guide including a top, bottom and side integral with each other, said top and bottom provided with alining openings, a longitudinally extending channel-shaped adjustable support mounted in each of said guides and provided with openings adapted to aline with the openings of the guides, vertical means extending through the alining openings for maintaining the supports in an adjusted position, and arms hinged to the forward ends of said supports and capable of being extended to longitudinally aline with the supports.

In testimony whereof I affix my signature in the presence of two witnesses.

PETER J. FLYNN.

Witnesses:
 MAX H. SROLOVITZ,
 CHRISTINA T. HOOD.

Copies of this patent may be obtained for five cents each, by addressing the "Commissioner of Patents, Washington, D. C."